United States Patent [19]

Fukumoto et al.

[11] 3,854,167
[45] Dec. 17, 1974

[54] VEHICLE DOOR HINGE

[75] Inventors: Riyouichi Fukumoto, Nagoya; Kenichi Fukura, Chiryu; Mizuo Nyunoya, Toyota, all of Japan

[73] Assignee: Aisin Seiki Kabushiki Kaisha (Aisin Seiki Co., Ltd.), Kariya City, Aichi Pref., Japan

[22] Filed: Mar. 2, 1973

[21] Appl. No.: 337,399

[30] Foreign Application Priority Data
Mar. 2, 1972 Japan.............................. 47-26146
Mar. 2, 1972 Japan.............................. 47-26147

[52] U.S. Cl. .................................................. 16/184
[51] Int. Cl. ............................................. E05f 1/12
[58] Field of Search ...................... 16/85, 184, 180

[56] References Cited
UNITED STATES PATENTS
2,712,149  7/1955  Harms.................................. 16/85
2,980,945  4/1961  Hollar, Jr............................. 16/85

*Primary Examiner*—Paul R. Gilliam
*Assistant Examiner*—Doris L. Troutman
*Attorney, Agent, or Firm*—Holman & Stern

[57] ABSTRACT

An automotive vehicle door hinge unit in which there is provided a first hinge element for fixed attachment to a vehicle body, a second hinge element for fixed attachment to a vehicle door, means pivotally coupling said hinge elements with each other, at least a spring element of channel shape, the spring element having a base portion constituting one of the hinge elements and a pair of resilient arms carrying outwardly projecting convex projections for executing frictional sliding engagement with part of the other one of the hinge elements.

10 Claims, 10 Drawing Figures

VEHICLE DOOR HINGE

BACKGROUND OF THE INVENTION

This invention relates to improvement in and relating to a hinge mechanism for an automobile door, with said mechanism being provided with spring means.

A defect in the above kind of door hinge is that the hinge cannot hold the door in its half-open position in a positively controlled and reliable manner.

The reason resides in that said spring means adapted for establishing a sliding frictional contact with the cooperating hinge element has only so limited overall dimensions that the provision of two projections is practically impossible. If it was possible to provide such projections, other defects could be encountered such that the necessary resiliently assisting force in the door-opening or closing directions and the door-holding force at the half-opened position of the door are substantially weakened.

OBJECT OF THE INVENTION

The object of the present invention is to provide a door hinge mechanism for obviating the aforementioned conventional defects.

The invention will become more apparent when read the detailed description of preferred several embodiments of the invention to follow.

DETAILED DESCRIPTION OF THE EMBODIMENTS

Figure 1:
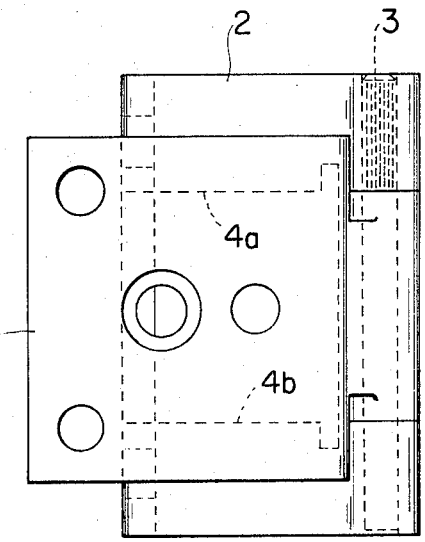
FIG. 1 is a front view of a door hinge unit illustrated in its basic structure in advance of attachment of the spring means.
Figure 2:
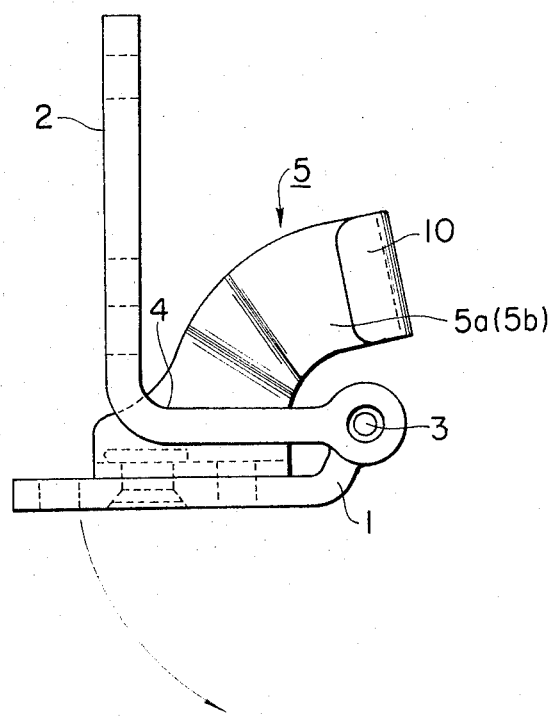
FIG. 2 is a plan view thereof.

In the following, several preferred embodiments of the invention will be described in detail by reference of the accompanying drawings.

In the first embodiment shown in FIGS. 1 – 5, numeral 1 represents a first hinge element to be attached to a door of an automotive vehicle, not shown. Numeral 2 shows a second hinge element to be attached to the body of the vehicle, not shown. A hinge pin 3 connects these hinge elements 1 and 2 at their related ends, so as to form a hinge unit, as shown.

Numeral 5 denotes a spring member having a generally channel section and fixedly attached to the first hinge element 1. The spring 5 is formed with projecting portions 5a and 5b at both its sides, as partially shown in FIG. 2, with said projecting portions 5a, 5b being adapted for establishing frictional engagement with open edges 4a, 4b (FIG. 1) formed in the hinge element 2, respectively. Spring 5 is provided with a projection 10 adapted for acting as a stop when it cooperates with second hinge member 2.

In the foregoing, the basic structure of a door hinge unit has been shown and described. In the following, referring to FIGS. 3 – 5, more specific features of the first embodiment having two upper and lower spring elements 5-1 and 5-2 to be attached to the upper and lower hinge units of a vehicle door will be described in detail.

Figure 3:
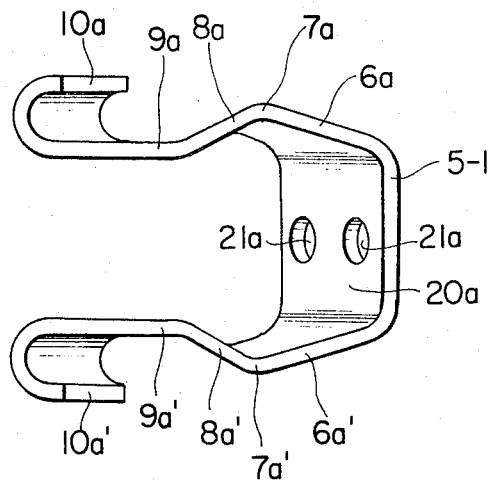
FIG. 3 is a plan view of a first element of said spring means.

In the upper spring element 5-1, shown in FIG. 3, of an upper hinge unit of a vehicle door, 10a and 10a ' represent semi-cylindrical stop projections adapted for engagement with wall parts in proximity of open edges 4a and 4b of the second hinge element 2. 9a and 9a' denote recessed parts, called "valleys", formed in close proximity to said stop projections 10a and 10a', respectively. 8a and 8a' denote rather sharply falling sloped portions formed in close proximity to the valleys and starting from respective apices 7a and 7a', repsectively. 6a and 6a' indicate rather slower rising sloped portions starting from both ends of a base part 20a of the hinge element 5-1 and ending at the apices 7a and 7a', repsectively, with said base part being perforated at 21a for the reception of bolts or like attaching means, so as to fixedly attach the upper spring element to first hinge element 1.

It may be well supposed that the upper spring element 5-1 represents a first resilient arm comprising the parts 6a, 7a, 8a, 9a and 10a and a second resilient arm comprising the parts 6a', 7a', 8a', 9a' and 10a' and these arms may flex laterally in both directions.

Figure 4:
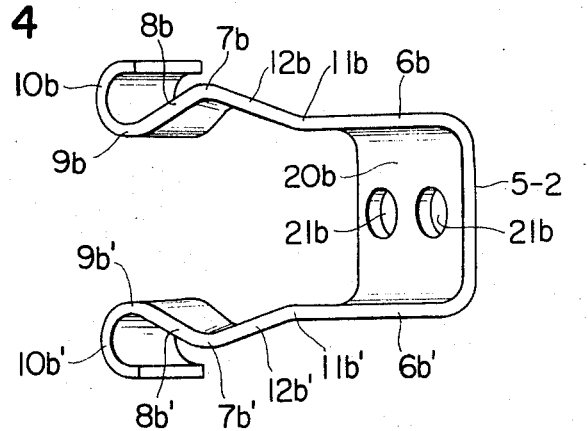
FIG. 4 is a similar view of a second element of said spring means.

Next, referring to FIG. 4, a second spring element 5-2 to be attached to a second or lower hinge unit of the same vehicle door, not shown, will be described in detail. As seen, in this second spring element 5-2, an outwardly projecting projection consisting of the parts 12b, 7b and 8b corresponding in their configuration and function to those denoted with 6a, 7a and 8a adopted in the first spring element 5-1, has been shifted in its phase by a certain distance towards the left relative to the corresponding projection of the element 5-1. It will be seen further that when both spring elements 5-1 and 5-2 are observed from above in their overlapping relationship as demonstrated in FIG. 5, the rising portion 12b of the second spring element 5-2 crosses the falling portion 8a of the first spring element 5-1. The rising sloped portion 12b starts from an apex 11b provided at the outer end of a parallel portion 6b extending axially from a side edge of the base portion 20b which corresponds to that shown at 20a in the first spring element 5-1. Stop projections 10b and 10b' are also formed on the second spring element 5-2 in correspondence to those shown at 10a and 10a' in the first spring element 5-1, respectively. Valleys 9b and 9b' are somewhat modified and shifted leftwards in FIG. 4, when compared with those denoted 9a and 9a' in the first spring element 5-1.

The parts 6b', 7b', 8b', 11b' and 12b' correspond to those denoted 6b, 7b, 8b, 11b and 12b and are arranged in opposite phase along the central axis, not shown, of the spring element 5-2. Perforations 21b corresponds to those denoted 21a in the first spring element.

Figure 5:
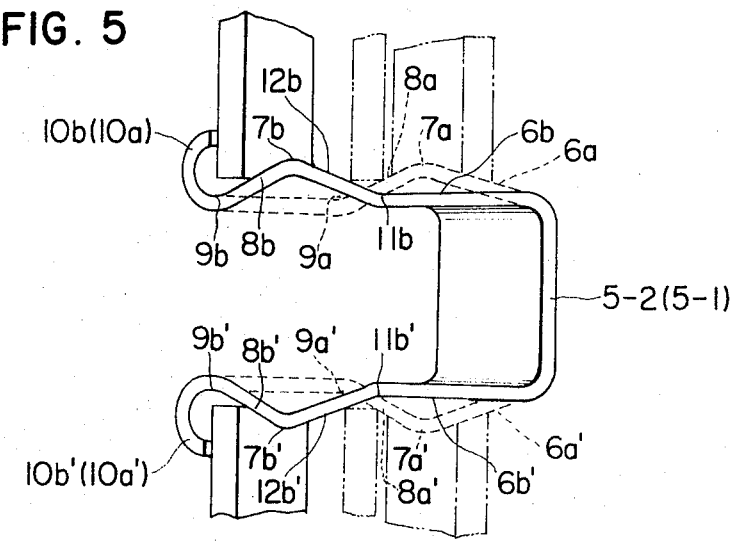
FIG. 5 is a similar view to FIG. 3, wherein, however, said both spring elements are viewed from a common direction.

In FIG. 5, the mutual distance between the apices 7a and 7b is to a properly selected short value, so that the door can be held positively in its half-opened position, as will be described more fully hereinafter.

The operation of the foregoing embodiment so far shown and described is as follows:

With the vehicle door completely closed, the rising sloped portions 6a and 6a' of the first or upper spring element 5-1 are kept in pressure contact with wall edges 4a and 4b of the upper one of the hinge units as at 2. In the lower hinge unit, however, there is no such pressure contact.

When the door is operated in its closed position towards its open position, a proper amount of frictional resistance is imparted to the door by the very presence of the frictional engagement between the parts 6a; 6a' and 4a; 4b in the upper hinge unit.

With further continued door-opening operation, the falling sloped portions 8a; 8a' are brought into pressure contact with the wall edges 4a; 4b, upon overriding the apices 7a; 7a', respectively. In this case, the door-opening operation is resiliently assisted. Upon establishment of the pressure contact at the middle of each of the falling portions 8a; 8a', a pressure engagement of the rising portions 12b; 12b' of second spring element 5-2 with wall edges 4a; 4b of the lower one of the hinge units will be initiated. In this way, the resiliently door-opening assisting force is counteracted by the oppositely acting resilient force. When these mutually counteracting resilient forces are balanced to each other, the door is held at its half-opened position.

With still further continued operation, the pressure engagement between the first spring element 5-1 with the upper hinge unit will become released, while that established between the second spring element 5-2 and the lower hinge unit is preserved. During engagement of wall edges 4a; 4b with the rising portions 12b; 12b' of second spring element 5-2, the door is subjected to a resiliently resisting force acting opposite to the door-opening direction. Upon overriding the apices 7b; 7b' and establishment of the pressure contact of falling portions 8b; 8b' with the wall edges 4a; 4b at the lower hinge unit, the door is subjected to a resiliently assisting force acting in the door-opening direction.

With the door fully opened, all the stop projections 10a, 10b, 10a' and 10b' are brought into engagement with said side wall edges 4a; 4b, respectively, and thus, the door is kept in its full open position positively.

The door-closing operation from its full-open position may be carried out in the reverse order.

Figure 6:
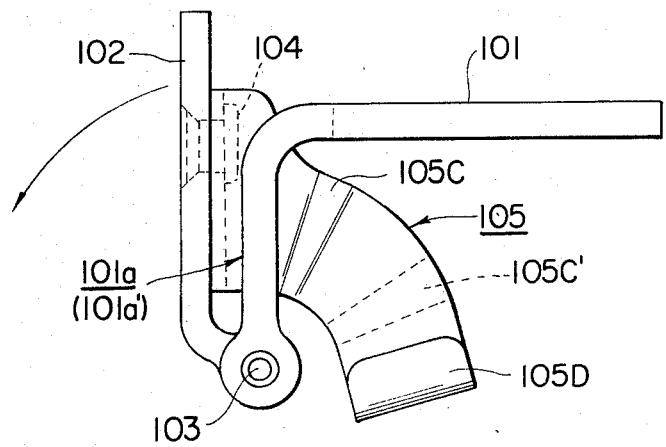
FIG. 6 is a view similar to FIG. 2, being seen, however, from a perpendicular direction to that employed in the foregoing, to FIG. 1, showing a second embodiment of the invention.
Figure 7:
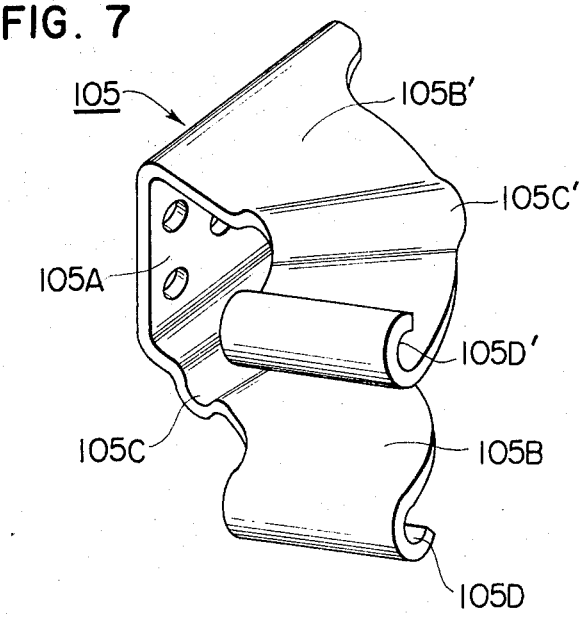
FIG. 7 is a perspective view of the spring means employed in the second embodiment.

Referring, next to FIGS. 6 – 7, the second embodiment will be described in detail.

In this second embodiment, several parts 101; 102; 103; 105 and 105D correspond to those denoted 2; 1; 3; 5 and 10, respectively, in their basic design, mutual arrangement and respective functions.

The spring element 105, is substantially of channel configuration, and has a base portion 105A which is fixedly attached by means of several rivets, as at 104, to the hinge element 102.

From the base portion 105A, extend a pair of resilient arms 105B and 105B'. As will become clear, these resilient arms 105B and 105B' are adapted for the establishment of resilient and slidable friction engagement with wall edges 101a and 101a' which correspond respectively to those denoted 4a and 4b in the first embodiment, although not specifically shown. Arms 105B and 105B' are formed with outwardly and convexly curved projections 105C and 105C', respectively, with these projections being phase-shifted along the respective axes of the arms, as in the case of those denoted 7a and 7b in the first embodiment. Curved stop projections 105D and 105D' formed at the respective free ends of these arms 105B and 105B', respectively, are similar to those denoted 10a and 10a' or 10b and 10b', in the first embodiment.

The operation of the second embodiment is as follows:

When the door is operated in its opening direction from its fully closed position, the second hinge element 102 is turned counter clockwise in FIG. 6, as shown by an arrow. During the first stage of this door-opening operation, one of the wall edges at 101a is brought into pressurized sliding contact with the rising slope in advance of the curved projection 105C, whereby a proper amount of sliding friction is given through the second hinge element 102 to the opening door. With further door-opening operation, the wall edge 101a will be brought into pressure contact with the rising portion on the arm 105B upon riding over the apex part of said projection 105C, with the door being resiliently urged to turn in its opening direction. In the middle of this urging stage, the other wall edge 101a' will be brought into pressure contact with the rising part of said curved projection, so as to provide a frictional resistance force to the opening door. Therefore, the middle point corresponds to the positively controlled half-opened position of the vehicle door.

With still further opening operation of the door, the wall edge 101a' is brought into the fallingly sloped part of the said projection 105C', whereby a resiliently accelerating force is applied to the opening door. Finally, upon contact of the curved stop projections 105D and 105D' of the both arms with the wall edges 101a and 101a', respectively, the door is kept in its fully open position in a positively controlled manner. If necessary, the other hinge unit may be of the same structure and operation as above. Alternatively, the other hinge unit may be of such a structure that it supports the door only in a pivotable manner.

In the door hinge unit constructed in accordance with the present embodiment, the pressure contact of one of the projections 105D and 105D' is not affected by the establishment of the pressure contact at the other projection and thus no harmful effect can be met in the resiliency of the spring element.

Figure 8:
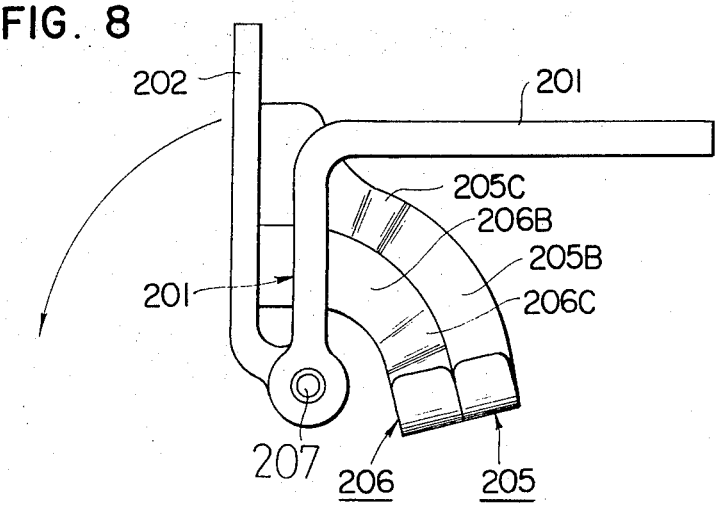
FIG. 8 is a similar view to FIG. 6, showing the corresponding structure of a third embodiment.
Figure 9:
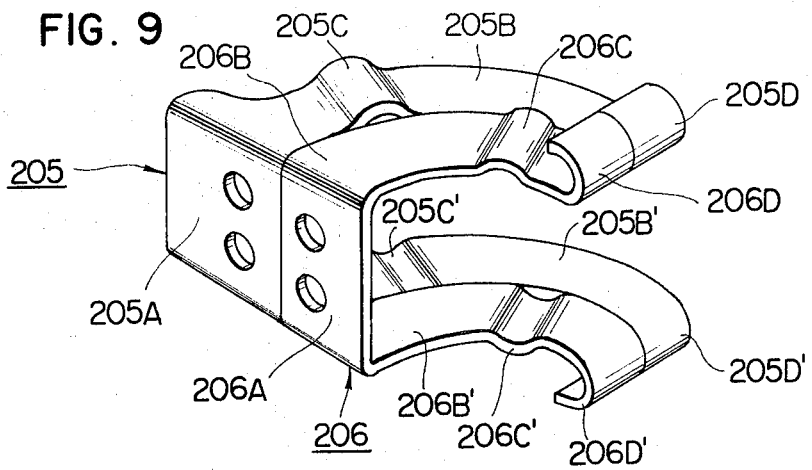
FIG. 9 is a perspective view of the spring means adopted in the third embodiment.

Referring next to FIGS. 8 and 9, the third embodiment of the present invention will be described in detail.

Numeral 201 denotes a first hinge element which is fixedly attached to the body of an automotive vehicle, such vehicle is not shown.

Numeral 202 represents a second hinge element of a door hinge unit and is rigidly connected with the vehicle door. The first and second hinge elements 201 and 202 are pivotably coupled by a pivot pin 207. Numeral 205 is a first resilient spring element of a generally channel shaped configuration, having its base portion 205A attached fixedly to second hinge element 202 by means of several rivets, not shown, similar to those denoted at 104 in the second embodiment. The first spring element 205 is formed with resilient arms 205B and 205B' having respective outwardly curved convex projections 205C and 205C' accurately in an opposite phase and in the same sequence. The free ends of these arms 205B and 205B' are bent up outwardly to form respective curved stop projections as before, adapted for engagement with the second hinge element 202 to serve as a positive stop means for keeping the door in its full open position.

In parallel to said first spring element, a second spring element 206 is provided and which has base protion 206A, two substantially parallel spring arms 206B and 206B'. This second spring element 206 is also fixedly attached as before, at its base portion 206A to the second hinge element 202.

The arms 206B and 206B' are formed equally with respective outwardly curved convex projections 206C and 206C' arranged in an opposite phase to each other, yet in the same sequence with each other. As seen, the projections 205C and 205C' are axially off set to those denoted 206C and 206C'. Curved stops 206D and 206D' are similar to those denoted 205D and 205D'.

In the same way as above-mentioned, the resilient arms 205B; 205B' and 206B; 206B' are adapted for pressure engagement with wall edges in the first hinge element 201 designed and arranged similar to those denoted 4a; 4b in the first embodiment, although not shown.

When the vehicle door is operated to its open position from its fully closed position, the second hinge element 202 is turned around pivot pin 207 in a counter clockwise direction in FIG. 8. Then, the wall edges in the first hinge element 201 will keep in sliding and resiliently pressurized contact with rising sloped parts in advance of the projections 205C and 205C', whereby the door is subjected to frictional resistance as before indicated. With a further opening operation of the door, the wall edges will be kept in pressure engagement with falling sloped portions downstream of the apices of the projections 205C and 205C', so that the door is subjected to a resiliently assisting force in the direction of door-opening. At the middle of this assisting step for the door-opening, the wall edges will be brought into sliding and pressurized contact with rising sloped portions in advance of the curved projections 206C and 206C' on the second spring element 206, whereby and additionally the door is subjected to a frictionally resistance force as above stated, until both the resiliently resisting and assisting forces are brought into balance with each other. The last-mentioned balanced position corresponds to the half open position of the door which is thus kept at this position, if the door opening effort is released.

With a further door-opening operation of the door, the wall edges will be brought into pressure contact with falling sloped portions downstream of the projections 206C and 206C', whereby the door is subjected to a resiliently assisting force. When the wall edges are brought into abutment with all the stop projections 205D, 205D', 206D and 206D', the door is kept positively in its full open position.

The door closing operation may be effected in the reverse order.

Figure 10:
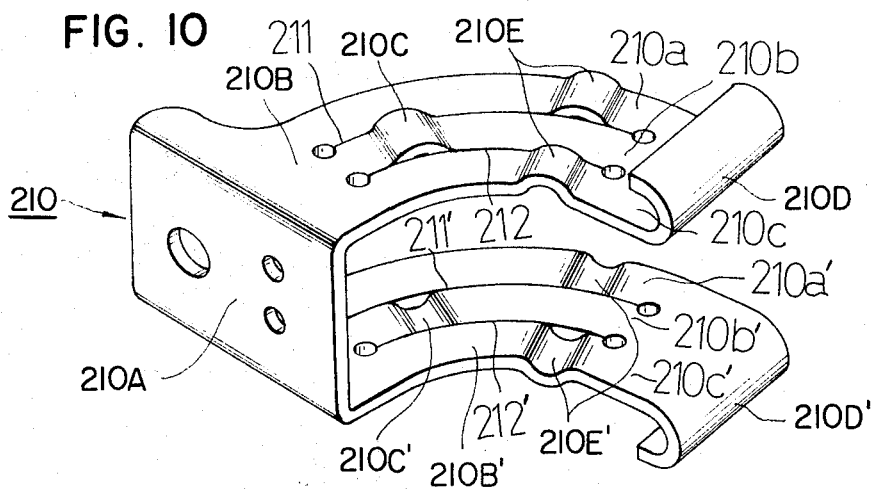
FIG. 10 is a similar view to FIG. 9, showing the spring means employed in the fourth embodiment.

In the case of the fourth embodiment of the invention shown in FIG. 10, a spring unit, generally denoted 210 consists of three parallel spring elements united rigidly together and separated only partially at curved separating grooves 211, 211', 212 and 212'.

A first spring element has a pair of arms 210a and 210a' having outwardly curved convex projections 210E and 210E', respectively. A second or central spring element has also a pair of arms 210b and 210b' having outwardly curved convex projections 210C and 210C', respectively. A third spring element has a pair of arms 210c and 210c' having outwardly curved convex projections 210E and 210E', respectively. These three pairs of resilient arms 210a; 210a', 210b; 210b' and 210c; 210c' are united at one end into a common base portion 210A, and at another end into common stop projections 210D and 210D' bent upwardly and rearwardly, as in the case of the first embodiment at 10a and 10a', respectively. As seen, four projections 210E and 210E' are positioned in a opposite manner, yet in same sequence. Leading projections 210C and 210C' are phase shifted to these four projections 210E; 210E'. Although not specifically analized, it will be clear that the same function may be attained in the third embodiment.

The embodiments of the invention in which an exclusive property or privilege is claimed are as follows:

1. An automotive vehicle door hinge having first and second hinge units, each hinge unit comprising, in combination, a first hinge element for fixed attachment to a vehicle body, a second hinge element for fixed attachment to a vehicle door, a hinge pin pivotally interconnecting said first and second hinge elements with each other, a spring element of channel confirugation having a base portion for fixed attachment to one of said hinge elements and a pair of resilient arms, each resilient arm being provided with an outwardly projecting convex projection for executing frictional sliding engagement with part of one of said hinge elements, each pair of projections provided on the resilient arms of the spring elements of said first and second units being respectively located differently in two phases for engaging with the part of said other hinge elements in two phases differing in time when the door is being opened or closed so that the door is kept in its half-open or closed position.

2. The automotive vehicle door hinge as claimed in claim 1, in which said part of said other one of said hinge elements is of hollow window shape through which said channelshaped spring element slidably passes.

3. The automotive vehicle door hinge as claimed in claim 1, in which free ends of said arms are bent outwardly for engagement with said other one of said hinge elements for allowing a stopping function upon the door being fully open.

4. An automotive vehicle door hinge unit comprising, in combination, a first hinge element for fixed attachment to a vehicle body, a second hinge element for fixed attachment to a vehicle door, a hinge pin pivotally interconnecting said hinge elements with each other, a spring element of channel configuration, said spring element having a base portion for fixed attachment to one of said hinge elements and a pair of resilient arms, each of said resilient arms being provided with an outwardly projecting convex projection for executing frictional sliding engagement with part of the other one of said hinge elements, said projections being respectively located differently in two phases on the resilient arms for engaging with said other hinge element in two different phases differing in time when the door is being opened or closed, so that the door is kept in its half-opened or closed position.

5. The automotive vehicle door hinge as claimed in claim 4, in which said spring element is a one-piece leaf spring, with each arm having the projection in different phases.

6. The automotive vehicle door hinge as claimed in claim 4, in which said spring element constitutes a plurality of leaf springs, the respective arms of which have the projections in different two phases.

7. The automotive vehicle door hinge as claimed in claim 6, in which said plurality of leaf springs is fixed in parallelism to each other.

8. The automotive vehicle door hinge as claimed in claim 7, in which base portions and free end portions of the plurality of leaf springs are integral.

9. The automotive vehicle door hinge as claimed in claim 4, in which said part of the other one of said hinge elements is of hollow window shape and through which said channel-shaped spring element slidably passes.

10. The automotive vehicle door hinge as claimed in claim 4, in which free ends of said arms are bent outwardly for engaging said other one of said hinge elements for permitting the stopping function upon the door being fully opened.

* * * * *